United States Patent
Dong (10) Patent No.: US 9,519,780 B1
(45) Date of Patent: Dec. 13, 2016

(54) SYSTEMS AND METHODS FOR IDENTIFYING MALWARE

(71) Applicant: Symantec Corporation, Mountain View, CA (US)

(72) Inventor: Jiang Dong, Dawn Ville (SG)

(73) Assignee: Symantec Corporation, Mountain View, CA (US)

( * ) Notice: Subject to any disclaimer, the term of this patent is extended or adjusted under 35 U.S.C. 154(b) by 52 days.

(21) Appl. No.: 14/570,393

(22) Filed: Dec. 15, 2014

(51) Int. Cl.
*G06F 21/56* (2013.01)
*H04L 29/06* (2006.01)

(52) U.S. Cl.
CPC .......... *G06F 21/564* (2013.01); *H04L 63/145* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 6,338,141 B1* | 1/2002 | Wells | ...................... | G06F 21/56 714/28 |
| 7,409,717 B1* | 8/2008 | Szor | ...................... | G06F 21/566 711/109 |
| 8,732,825 B2* | 5/2014 | Park | ...................... | G06F 21/562 726/22 |
| 8,826,439 B1* | 9/2014 | Hu | ........................ | G06F 21/563 726/24 |
| 9,213,839 B2* | 12/2015 | Cao | ........................ | G06F 21/563 |
| 9,361,458 B1* | 6/2016 | Feng | ...................... | G06F 21/563 |
| 2006/0064755 A1* | 3/2006 | Azadet | ................... | G06F 21/564 726/24 |
| 2007/0094734 A1* | 4/2007 | Mangione-Smith | .. | G06F 21/564 726/24 |

(Continued)

OTHER PUBLICATIONS

Zheng, M. et al., "Droid analytics: A signature based analytic system to collect, extract, analyze and associate android malware", 2013 12th IEEE International Conference on Trust, Security and Privacy in Computing and Communications (TrustCom '13), pp. 163-171, IEEE, 2013.*

(Continued)

*Primary Examiner* — Andrew Nalven
*Assistant Examiner* — Christopher Ruprecht
(74) *Attorney, Agent, or Firm* — FisherBroyles LLC (57) ABSTRACT

A computer-implemented method for identifying malware may include (1) determining, for multiple commands within bytecode associated with a malware program, whether each command constitutes an invocation command, (2) filtering, based on the determination, invocation commands from the bytecode, (3) adding, for each invocation command filtered from the bytecode, an opcode, a format code, and a function prototype to a collection of opcodes, format codes, and function prototypes, (4) generating a digital fingerprint of the collection including the opcode, the format code, and the function prototype for each invocation command filtered from the bytecode, and (5) performing, by a computer security system, a remedial action to protect a user in response to detecting the presence of a variant of the malware program by determining that the digital fingerprint matches a candidate instance of bytecode under evaluation. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2008/0016573 A1* | 1/2008 | Lyashko | ............... | G06F 21/563 726/24 |
| 2008/0127336 A1* | 5/2008 | Sun | ................ | G06F 21/566 726/22 |
| 2010/0235913 A1* | 9/2010 | Craioveanu | ............ | G06F 21/563 726/23 |
| 2013/0111591 A1* | 5/2013 | Topan | ................ | G06F 21/563 726/24 |
| 2014/0283041 A1* | 9/2014 | Cao | ................ | G06F 21/563 726/22 |
| 2015/0052611 A1* | 2/2015 | Wang | ................ | G06F 21/561 726/24 |
| 2015/0052612 A1* | 2/2015 | Wang | ................ | G06F 21/561 726/24 |
| 2015/0186649 A1* | 7/2015 | Humble | ............. | G06F 21/564 726/23 |
| 2015/0229673 A1* | 8/2015 | Lee | ................ | G06F 21/56 726/1 |
| 2016/0072833 A1* | 3/2016 | Kim | ................ | H04L 63/1425 726/23 |
| 2016/0094564 A1* | 3/2016 | Mohandas | ............ | H04L 63/145 726/24 |

OTHER PUBLICATIONS

Cao, Y. et al., "Jshield: towards real-time and vulnerability-based detection of polluted drive-by download attacks", Proceedings of the 30th Annnual Computer Security Applications Conference (ACSAC '14, Dec. 8-12, 2014, New Orleans, LA, USA), pp. 466-475, ACM, 2014.*

Shosha, A. et al., "Evasion-resistant malware signature based on profiling kernel data structure objects", 2012 7th International Conference on Risk and Security of Internet and Systems (CRiSIS '12), pp. 1-8, IEEE, 2012.*

Hu, W. et al., "Migdroid: Detecting app-repackaging android malware via method invocation graph", 2014 23rd International Conference on Communication Communication and Networks (ICCCN '14, Aug. 4, 2014), pp. 1-7, IEEE, 2014.*

"Dalvik Technical Information" website for Android Developers, extracted using Google's "Wayback Machine" in order to predate the Dec. 15, 2014 filed of the present application, https://web.archive.org/web/20141019065359/http://source.android.com/devices/tech/dalvik/index.html, Oct. 2014.*

Santos, I. et al., "Idea: Opcode-Sequence-Based Malware Detection", F. Massacci, D. Wallach, and N. Zannone (Eds.): ESSoS 2010, LNCS 5965, pp. 35-43, Springer-Verlag Berlin Heidelberg 2010.*

Abubakar Wawda, et al; Systems and Methods for Classifying Package Files as Trojans; U.S. Appl. No. 14/486,424, filed Sep. 15, 2014.

Crussell, Jonathan et al., "Attack of the Clones: Detecting Cloned Applications on Android Markets", http://web.cs.ucdavis.edu/~hchen/paper/esorics2012.pdf, as accessed on Jul. 30, 2014, ESORICS 2012, LNCS 7459, Springer-Verlag Berlin Heidelberg, (2012), pp. 37-54.

"Lookout", https://www.lookout.com/, as accessed Jul. 30, 2014, (Jan. 2, 1997).

"Kaspersky", http://usa.kaspersky.com/?domain=kaspersky.com, as accessed Jul. 30, 2014, (1997).

Mimoso, Michael, "Scanner Finds Malicious Android Apps at Scale", https://threatpost.com/scanner-finds-malicious-android-apps-at-scale/114438/, as accessed Aug. 27, 2015.

Chen, Kai et al., "Finding Unknown Malice in 10 Seconds: Mass Vetting for New Threats at the Google-Play Scale", https://www.usenix.org/system/files/conference/usenixsecurity15/sec15-paper-chen-kai.pdf, as accessed Aug. 27, 2015, Proceedings of the 24th USENIX Security Symposium, Washington, D.C., (Aug. 12-14, 2015).

"Dalvik Executable instruction formats", https://source.android.com/devices/tech/dalvik/instruction-formats.html, as accessed Nov. 5, 2014, (Jun. 23, 2013).

"Dalvik Executable format", http://source.android.com/devices/tech/dalvik/dex-format.html, as accessed Nov. 5, 2014, (Jun. 23, 2013).

"Dalvik bytecode", https://source.android.com/devices/tech/dalvik/dalvik-bytecode.html, as accessed Nov. 5, 2014, (Jun. 9, 2013).

"Bytecode", https://en.wikipedia.org/wiki/Bytecode, as accessed Nov. 5, 2014, Wikipedia, (Dec. 4, 2003).

"Function prototype", http://en.wikipedia.org/wiki/Function_prototype, as accessed Nov. 5, 2014, Wikipedia, (May 27, 2005).

* cited by examiner

SYSTEMS AND METHODS FOR IDENTIFYING MALWARE

BACKGROUND

Individuals and organizations typically seek to protect their computing resources from malware attacks. Traditional security systems may attempt to provide this protection by generating signatures for various malware programs. The security systems may then generate further signatures for any candidate malware programs that are under evaluation. Accordingly, the security systems may detect the presence of instances of the malware programs by determining that a newly generated signature matches a previously generated signature for a known malware program.

Unfortunately, attackers have responded to these traditional systems for detecting malware by using polymorphic malware, which may randomly or arbitrarily modify numerous copies of the malware program such that the copies are sufficiently unique to break the previously generated signature. The random modifications may be trivial or nonfunctional such that they do not significantly alter the functionality of the malware program, yet the modifications may also be sufficient to generate a different signature for the modified copy, thereby breaking the signature detection. For example, attackers may modify the package name and the application name for malware directed to ANDROID mobile computing systems. Similarly, attackers may modify malware programs to include different string constants or encrypted strings, or otherwise modify the programs to obfuscate the code. Accordingly, the instant disclosure identifies and addresses a need for additional and improved systems and methods for identifying malware.

SUMMARY

As will be described in greater detail below, the instant disclosure generally relates to systems and methods for identifying malware by, for example, stripping the malware code of various portions that may potentially change, while preserving an essential core that effectively identifies the malware program and prevents successful polymorphism. Specifically, the systems and methods may strip the malware code of non-invocation commands and then generate a digital fingerprint of a collection of opcodes, format codes, and function prototypes for remaining invocation commands, as discussed further below.

In one example, a computer-implemented method for identifying malware may include (1) determining, for multiple commands within bytecode associated with a malware program, whether each command constitutes an invocation command, (2) filtering, based on the determination, invocation commands from the bytecode, (3) adding, for each invocation command filtered from the bytecode, an opcode, a format code, and a function prototype to a collection of opcodes, format codes, and function prototypes, (4) generating a digital fingerprint of the collection including the opcode, the format code, and the function prototype for each invocation command filtered from the bytecode, and (5) performing, by a computer security system, a remedial action to protect a user in response to detecting the presence of a variant of the malware program by determining that the digital fingerprint matches a candidate instance of bytecode under evaluation.

In some examples, generating the digital fingerprint may include excluding, through the filtering, at least one non-invocation command from the collection used to generate the digital fingerprint based on a determination that the non-invocation command does not constitute an invocation command. In further examples, generating the digital fingerprint may include excluding, through the filtering, multiple non-invocation commands from the collection used to generate the digital fingerprint based on a determination that each non-invocation command does not constitute an invocation command. In even further examples, generating the digital fingerprint may include excluding, through the filtering, each non-invocation command in the bytecode associated with the malware program from the collection used to generate the digital fingerprint based on a determination that each non-invocation command in the bytecode does not constitute an invocation command.

In one embodiment, the opcode identifies a type of the invocation command. In further embodiments, the function prototype identifies (1) a number and type of parameters passed to a function through the invocation command, and/or (2) a number and type of return values returned by the function after invoking its execution through the invocation command. In even further embodiments, the format code may specify information that describes the format of the invocation command. In one embodiment, the format code specifies: (1) an argument word count for the invocation command, and (2) information describing registers used by the invocation command.

In a further embodiment, the computer-implemented method may further include adding a function prototype for the bytecode associated with the malware program to the collection prior to generating the digital fingerprint. Moreover, generating the digital fingerprint may include generating the digital fingerprint of the collection that includes the added function prototype for the bytecode in addition to the opcode, the format code, and the function prototype for each invocation command within the bytecode.

In some examples, the computer-implemented method may further include ordering the invocation commands in the collection prior to generating the digital fingerprint of the collection. In further examples, filtering the invocation commands may further include excluding a predefined portion of the invocation commands from the collection prior to generating the digital fingerprint. In even further examples, filtering the invocation commands may further include excluding a remainder beyond a predefined prefix of the invocation commands from the collection prior to generating the digital fingerprint. In additional examples, filtering the invocation commands may further include excluding a remainder before a predefined suffix of the invocation commands from the collection prior to generating the digital fingerprint. In one embodiment, the digital fingerprint may include a cryptographic hash of the collection that includes the opcode, the format code, and the function prototype for each invocation command filtered from the bytecode.

In one embodiment, a system for implementing the above-described method may include (1) a determination module, stored in memory, that determines, for multiple commands within bytecode associated with a malware program, whether each command constitutes an invocation command, (2) a filtration module, stored in memory, that filters, based on the determination, invocation commands from the bytecode, (3) an addition module, stored in memory, that adds, for each invocation command filtered from the bytecode, an opcode, a format code, and a function prototype to a collection of opcodes, format codes, and function prototypes, (4) a generation module, stored in memory, that generates a digital fingerprint of the collection including the opcode, the format code, and the function prototype for each invocation command filtered from the bytecode, (5) a performance module, stored in memory, that performs, through a computer security system, a remedial action to protect a user in response to detecting the presence of a variant of the malware program by determining that the digital fingerprint matches a candidate instance of bytecode under evaluation, and (6) at least one physical processor configured to execute the determination module, the filtration module, the addition module, the generation module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine, for multiple commands within bytecode associated with a malware program, whether each command constitutes an invocation command, (2) filter, based on the determination, invocation commands from the bytecode, (3) add, for each invocation command filtered from the bytecode, an opcode, a format code, and a function prototype to a collection of opcodes, format codes, and function prototypes, (4) generate a digital fingerprint of the collection including the opcode, the format code, and the function prototype for each invocation command filtered from the bytecode, and (5) perform, by a computer security system, a remedial action to protect a user in response to detecting the presence of a variant of the malware program by determining that the digital fingerprint matches a candidate instance of bytecode under evaluation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying malware. As will be explained in greater detail below, the systems and methods described herein may prevent successful polymorphism of malware programs by generating digital fingerprints for those programs that are based on core or essential features of those programs instead of potentially changing or variable features. Specifically, the systems and methods described herein may generate a digital fingerprint based on the invocation commands within malware code, as opposed to non-invocation commands, which may be more likely to change in polymorphic variants, as discussed below.

Figure 1:
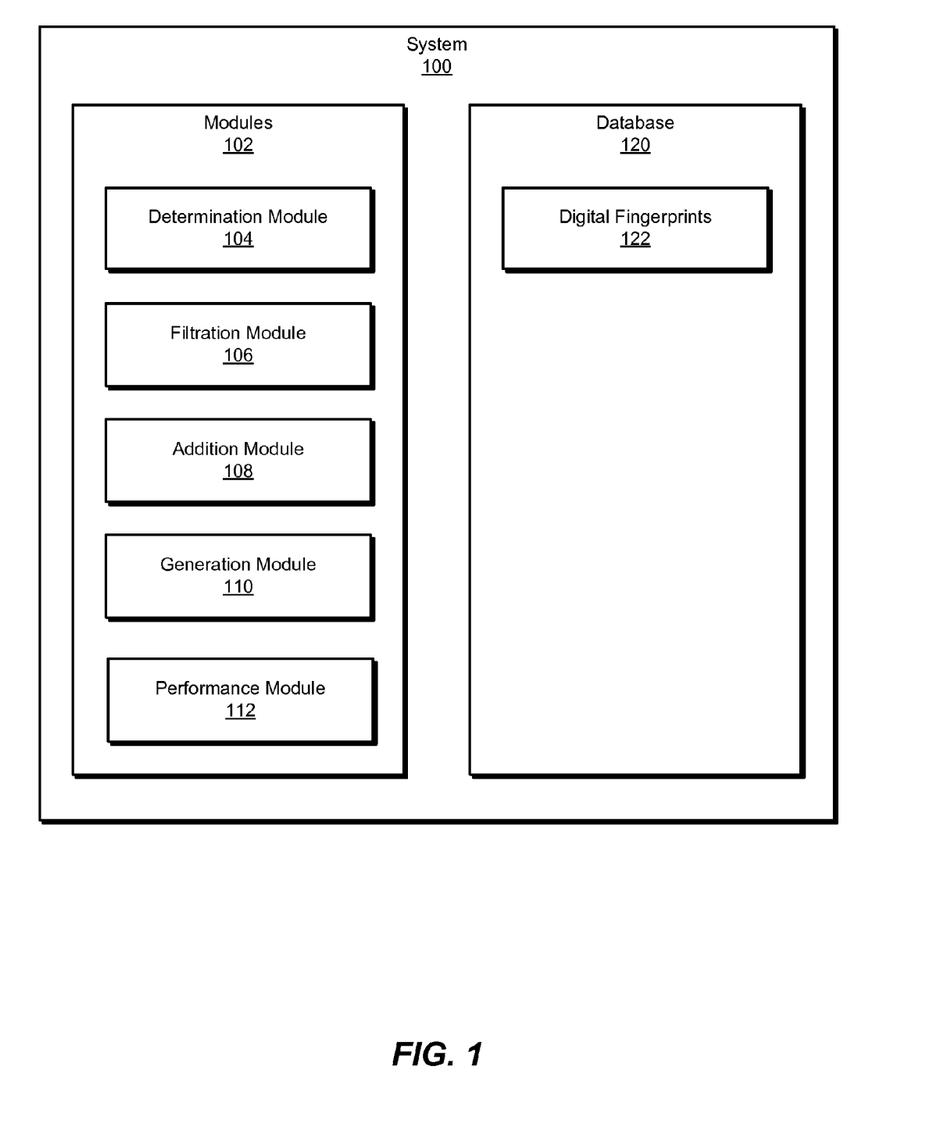
FIG. 1 is a block diagram of an exemplary system for identifying malware.
Figure 2:
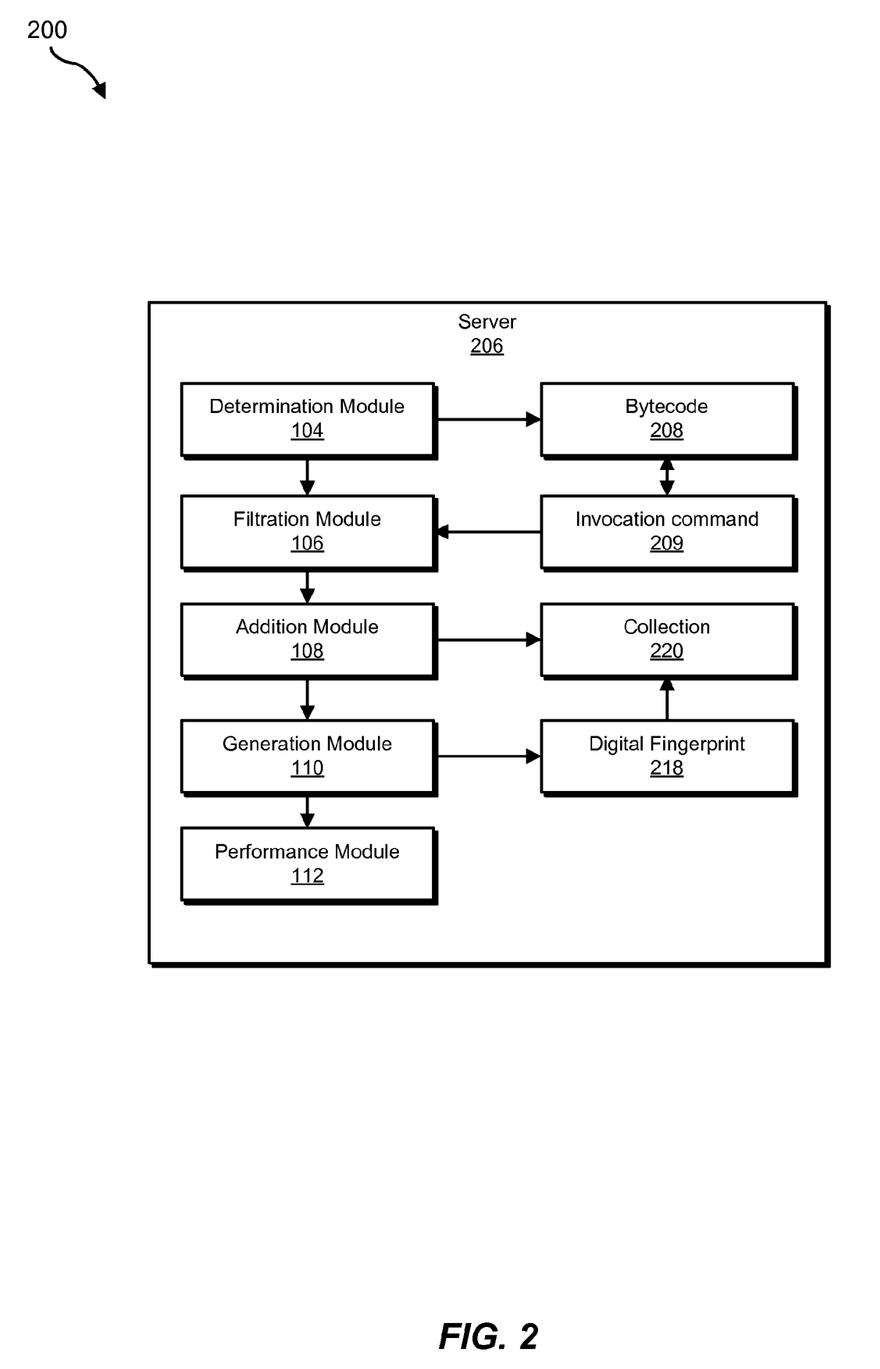
FIG. 2 is a block diagram of an additional exemplary system for identifying malware.

The following will provide, with reference to FIGS. 1-2, detailed descriptions of exemplary systems for identifying malware. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for identifying malware. As illustrated in this figure, exemplary system 100 may include one or more modules 102 for performing one or more tasks. For example, and as will be explained in greater detail below, exemplary system 100 may also include a determination module 104 that may determine, for multiple commands within bytecode associated with a malware program, whether each command constitutes an invocation command. Exemplary system 100 may additionally include a filtration module 106 that may filter, based on the determination, invocation commands from the bytecode. Exemplary system 100 may also include an addition module 108 that may add, for each invocation command filtered from the bytecode, an opcode, a format code, and a function prototype to a collection of opcodes, format codes, and function prototypes.

Exemplary system 100 may additionally include a generation module 110 that may generate a digital fingerprint of the collection including the opcode, the format code, and the function prototype for each invocation command filtered from the bytecode. Exemplary system 100 may also include a performance module 112 that may perform, through a computer security system, a remedial action to protect a user in response to detecting the presence of a variant of the malware program by determining that the digital fingerprint matches a candidate instance of bytecode under evaluation. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store digital fingerprints 122, which may include a multitude of digital fingerprints generated by a computer security system, using the techniques described below, to identify specific instances and strains of malware programs. The computer security system may then generate new fingerprints for candidate malware programs under evaluation and check whether the new fingerprints match the previously stored digital fingerprints 122, as discussed further below.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a server 206, which may be programmed with one or more of modules 102 and/or may store all or a portion of the data in database 120. Alternatively, a client-side computing system may include one or more of modules 102 and may interface with server 206. For example a client-side computing system may contain an antivirus agent that may check for the arrival of malware at the client-side computing system by referencing digital fingerprints 122, which may be stored on server 206. In further examples, all of modules 102 may be stored client-side.

In one embodiment, one or more of modules 102 from FIG. 1 may, when executed by at least one processor of server 206, enable server 206 to identify malware. For example, and as will be described in greater detail below, determination module 104 may determine, for multiple commands within bytecode 208 associated with a malware program, whether each command constitutes an invocation command. Filtration module 106 may filter, based on the determination, invocation commands, including an invocation command 209, from bytecode 208. Addition module 108 may add, for each invocation command filtered from bytecode 208, an opcode, a format code, and a function prototype to a collection 220 of opcodes, format codes, and function prototypes. Generation module 110 may generate a digital fingerprint 218 of collection 220 that includes the opcode, the format code, and the function prototype for each invocation command filtered from bytecode 208. Performance module 112 may perform, through a computer security system, a remedial action to protect a user in response to detecting the presence of a variant of a malware program by determining that digital fingerprint 218 matches a candidate instance of other bytecode under evaluation.

Server 206 generally represents any type or form of computing device that is capable of identifying malware, generating a digital fingerprint (or signature) to identify an instance of malware, and/or filtering invocation commands from bytecode. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
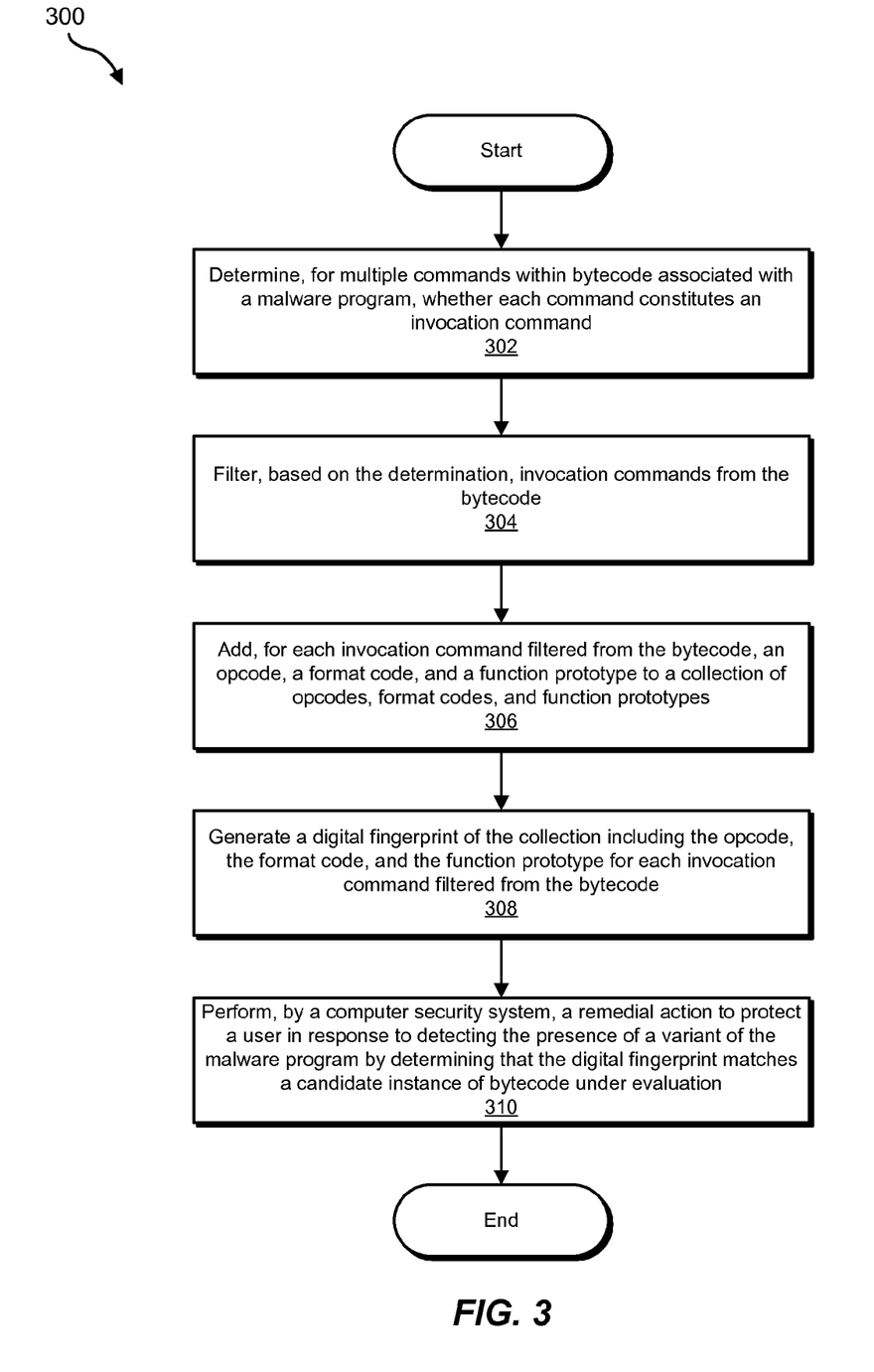
FIG. 3 is a flow diagram of an exemplary method for identifying malware.

FIG. 3 is a flow diagram of an exemplary computer-implemented method 300 for identifying malware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may determine, for multiple commands within bytecode associated with a malware program, whether each command constitutes an invocation command. For example, at step 302 determination module 104 may, as part of server 206 in FIG. 2, determine, for multiple commands within bytecode 208 associated with a malware program, whether each command constitutes an invocation command.

As used herein, the term "bytecode" generally refers to portable code or a form of instruction set designed for efficient execution by a software interpreter. Unlike human-readable source code, bytecodes are compact numeric codes, constants, and references (normally numeric addresses) which encode the result of parsing and semantic analysis of things like type, scope, and nesting depths of program objects. Bytecodes therefore allow much better performance than direct interpretation of source code. The name bytecode stems from instruction sets which have one-byte opcodes followed by optional parameters. Bytecode may often be either directly executed on a virtual machine (i.e., interpreter), or it may be further compiled into machine code for better performance. In one example, bytecode may refer to SMALI code, which corresponds to an assembler/disassembler for the DEX format used by DALVIK, which is ANDROID'S JAVA virtual machine implementation. Notably, bytecode associated with a malware program may include all or part of bytecode within an ANDROID application. Determination module 104 may begin analysis of bytecode by first parsing a DEX file to obtain all of the SMALI code and associated opcodes, format codes, and function prototypes, as discussed below.

As used herein, the term "invocation command" generally refers to a bytecode command that invokes a function or class, such as by jumping to an instruction where the function or class begins, passing parameters to the function or class, and/or returning one or more return values in response to execution. Accordingly, one can distinguish between invocation commands and non-invocation commands that perform other features such as moving a value to a register or creating an array. In SMALI, invocation commands may include invoke-virtual, invoke-direct, invoke-super, invoke-static, invoke-interface, invoke-virtual/range, invoke-direct/range, invoke-super/range, invoke-static/range, and invoke-interface/range commands. Similarly, the phrase "associated with a malware program" generally refers to bytecode that partially or entirely constitutes a program determined to be a malware program and/or that interfaces with such a malware program.

Figure 4:
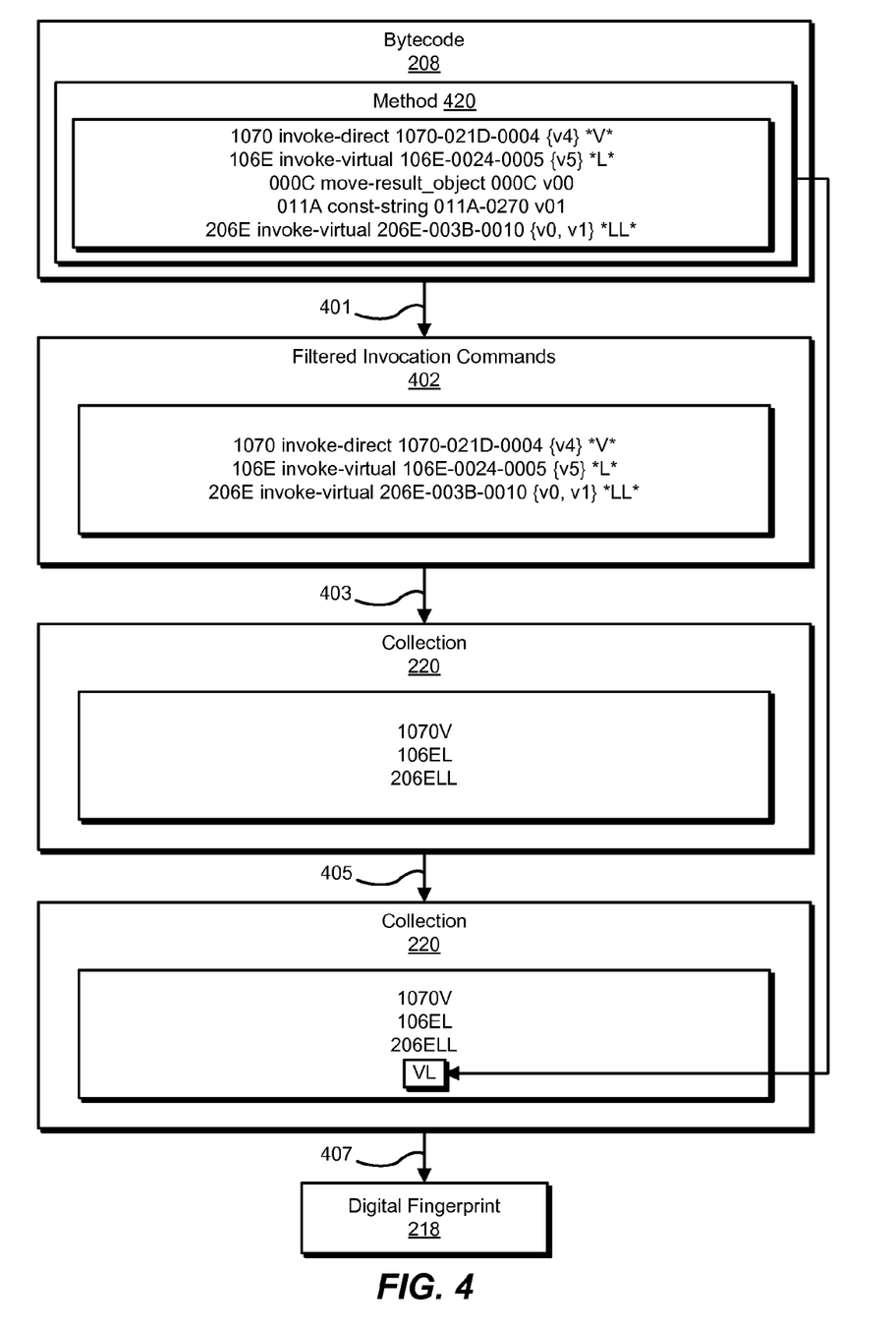
FIG. 4 is a block diagram of an exemplary work flow that illustrates a process for creating a collection of data to be used to generate a digital fingerprint.

Determination module 104 may determine whether the commands constitute invocation commands in a variety of ways. FIG. 4 illustrates multiple commands within bytecode 208. Each line of the bytecode within bytecode 208 may correspond to a separate command. As shown in FIG. 4, bytecode 208 may include three invocation commands (the first line, "invoke-direct," the second line, "invoke-virtual," and the fifth line, "invoke-virtual"). Similarly, bytecode 208 may also include two non-invocation commands at lines three and four.

Determination module 104 may determine that lines one, two, and five of bytecode 208 constitute invocation commands by searching for the keyword "invoke" or an equivalent term. Determination module 104 may similarly search for a binary or other representation of the keyword, such as an opcode instruction (e.g., in hexadecimal format). Moreover, determination module 104 may also search for one or more keywords known to refer to non-invocation commands. Accordingly, by detecting the presence of a non-invocation command, determination module 104 may conclude that the corresponding command does not constitute an invocation command. Determination module 104 may also analyze the structure of a command to determine whether the command constitutes an invocation command. For example, determination module 104 may conclude that a command constitutes an invocation command based on the structure of the command including parameters for passing to a function or class. In some examples, determination module 104 may determine that a command constitutes an invocation command by analyzing the opcode for the command. For example, determination module 104 may reference a cache or other data structure that maps opcodes to a designation as either an invocation command or non-invocation command. In general, determination module 104 may use any suitable technique or method for distinguishing between invocation commands and non-invocation commands.

At step 304 one or more of the systems described herein may filter, based on the determination, invocation commands from the bytecode. For example, at step 304 filtration module 106 may, as part of server 206 in FIG. 2, filter, based on the determination, invocation commands from bytecode 208. As used herein, the phrase "filter, based on the determination, invocation commands" generally refers to distinguishing between invocation commands and non-invocation commands to ensure that at least one or more non-invocation commands, if present, are excluded from the generation of a digital fingerprint, as discussed further below at step 308. Accordingly, in at least some embodiments, step 304 may substantially overlap, or be the same as, step 302, by merely performing a determination or distinguishing step that enables a non-invocation command, if present, to be filtered from the collection used to generate the digital fingerprint, as discussed further below.

Filtration module 106 may filter the invocation commands from the bytecode in a variety of ways. For example, filtration module 106 may delete one or more non-invocation commands (or corresponding opcodes, format codes, and/or function prototypes) from a copy of bytecode 208 (or from a list of corresponding opcodes, format codes, and/or function prototypes). In a parallel manner, filtration module 106 may add invocation commands to a list of invocation commands while excluding, or failing to include, one or more non-invocation commands to the list. In the example of FIG. 4, at step 401, which may correspond to filtration step 304, filtration module 106 may filter non-invocation commands at the third and fourth lines of bytecode 208, thereby producing filtered invocation commands 402. Notably, filtering invocation commands from bytecode 208 may constitute essentially the same functionality as filtering non-invocation commands from a collection used to generate the digital fingerprint, as discussed further below.

In some examples, filtration module 106 may filter only a portion of identified invocation commands while failing to filter, or omitting, a remaining portion of identified invocation commands. In other words, filtration module 106 may filter the invocation commands further by excluding a predefined portion of the invocation commands from the collection prior to generating the digital fingerprint, as discussed further below at step 308. For example, filtration module 106 may filter the invocation commands further by excluding a remainder beyond a predefined prefix of the invocation commands from the collection prior to generating the digital fingerprint. As used herein, the term "prefix" generally refers to one or more invocation commands at the start of a list of invocation commands. In the example of FIG. 4, either the first line or the first and second lines of filtered invocation commands 402 may constitute a prefix of filtered invocation commands 402. Accordingly, filtration module 106 may filter the prefix from bytecode 208 while failing to filter the third or second and third lines of filtered invocation commands 402 (e.g., according to a second filtration step prior to generation of the digital fingerprint, as discussed further below). Notably, as used herein, the phrase "filtering invocation commands" generally refers to either filtering the literal commands themselves as well as to filtering corresponding opcodes, format codes, and/or function prototypes that define the invocation commands.

Similarly, and conversely, filtration module 106 may filter the invocation commands further by excluding a remainder before a predefined suffix of the invocation commands from the collection prior to generating the digital fingerprint. Thus, instead of only filtering a prefix at the start of a list of invocation commands, filtration module 106 may instead (or additionally) filter a suffix at the end of the list. In general, filtration module 106 may filter any predefined portion or portions of a list of invocation commands, rather than simply filtering each and every identified invocation command in the list. By further winnowing the list of invocation commands, such as by further filtering the prefix and/or suffix, as discussed above, filtration module 106 may increase the focus on essential attributes of the malware program, will avoiding potentially changing or nonfunctioning portions of the bytecode.

Similarly, in some examples, filtration module 106 may determine whether an invocation command constitutes a dummy or junk invocation command inserted for malware polymorphism. For example, filtration module 106 may determine that the invocation command does not significantly alter the functionality of the program, does not alter a variable or state, and/or does not have any output or malware-related output. Upon making such a determination, filtration module 106 may further filter the dummy or junk invocation command from the collection used to generate the digital fingerprint.

At step 306 one or more of the systems described herein may add, for each invocation command filtered from the bytecode, an opcode, a format code, and a function prototype to a collection of opcodes, format codes, and function prototypes. For example, at step 306 addition module 108 may, as part of server 206 in FIG. 2, add, for each invocation command filtered from bytecode 208, an opcode, a format code, and a function prototype to collection 220 of opcodes, format codes, and function prototypes.

As used herein, the term "opcode" generally refers to any code that specifies a type of the corresponding command (e.g., identifies a unique command) in the bytecode instruction set. Similarly, as used herein, the term "format code" specifies information that describes the format of the invocation command. In one embodiment, the format code specifies: (1) an argument word count of the invocation command, and/or (2) information describing registers used by the invocation command. For example, a format code may include a two digit number, where the first digit indicates an argument word count of the invocation command, and the second digit describes registers used by the invocation command (e.g., a maximum number of registers used). Notably, for the DALVIK instruction set, addition module 108 may obtain the format code by first identifying a format symbol for the opcode within a format symbol lookup table. For example, the opcode "70" in the first line of bytecode 208 in FIG. 4 may correspond to a format symbol of "35c." Other examples of DALVIK format symbols, which may not correspond to invocation commands, may include "10x," "12x," and "11n."

After deriving the format symbol, the symbol alone may not be sufficient to fully describe the structure of the invocation command, because the invocation command may have variant structures indicated by the same format symbol. Accordingly, addition module 108 may determine a format code, such as "10," to specify the specific structure of the invocation command, where the "1" indicates an argument word count of one, and the second digit describing registers is not used for this particular command (and in some embodiments may be omitted). Examples of format symbols for invocation commands in DALVIK may include "35c," "35ms," "35mi," "3rc," "3rms," and "3rmi," as outlined in the publicly available description of DALVIK executable instruction formats. Nevertheless, the above merely describes one exemplary embodiment, and the term "format code," as used herein, may generally refer to any data that describes or specifies the actual or specific format of an invocation command and/or that distinguishes a specific variant from among multiple variant structures covered by a single format symbol, as described above.

Notably, the format code and the function prototype (as discussed below) may both indicate a number of parameters, but these values may differ, because the argument word count in the format code may additionally include an increment for the instant object and not just parameters passed to the function. Similarly, the function prototype, but not the format code, may indicate the types (Boolean, long, integer, etc.) of the parameters.

Furthermore, as used herein, the term "function prototype" generally identifies at least one of: (1) a number and type of parameters passed to a function through the invocation command, and/or (2) a number and type of return values returned by the function after invoking its execution through the invocation command. Notably, the term "function," as used herein, is generally interchangeable with essentially similar terms like "module" and "class," except where otherwise indicated. Moreover, a function may lack either a return value and/or lack any parameters. Furthermore, by convention, a function prototype may list a return value before listing one or more parameters. In DALVIK, a function prototype may include the following symbols: "V" (void, only valid for return values), "Z" (Boolean), "B" (byte), "S" (short), "C" (character), "I" (integer), "J" (long), "F" (float), "D" (double), and "L" (a class, which may be identified by the fully qualified class name). Moreover, a function in DALVIK may only have one return value, such that only the first character of the function prototype may identify the return value. For example, the function prototype "VSS" would identify a function that returns no value (void) while accepting two short values as parameters. Nevertheless, these examples are merely exemplary, and any suitable function prototypes and conventions that identify the same information may be used.

In the example of FIG. 4, at step 403, which may correspond to step 306, addition module 108 may add the respective opcode, format code, and function prototype for each of the filtered invocation commands in bytecode 208 (shown at the top of FIG. 4, in the first, second, and fifth lines) to a collection 220. For example, the first line of collection 220 is "1070V," which may indicate a format code of "10," as discussed above, an opcode of "70," and a function prototype of "V," which may further indicate a function that returns no value (void) while accepting no parameters. Addition module 108 may similarly add the opcode, format code, and function prototype for the remaining two filtered invocation commands to collection 220, as shown in FIG. 4. Notably, in alternate embodiments, addition module 108 may omit one or more of the opcode, format code, and function prototype, for one or more of the filtered invocation commands (e.g., omit the format code and/or the function prototype for all filtered invocation commands). Moreover, addition module 108 may order and rearrange these values within collection 220 according to any convention or algorithm, as discussed further below (e.g., in the order that the invocation commands appear in the bytecode, in the order that the invocation commands are identified, in the order defined by an ordering algorithm, and/or according to any other formatting or ordering convention). The ordering algorithm may have the property that the algorithm produces the same ordering for any previously different ordering of the same set of invocation commands.

At step 308 one or more of the systems described herein may generate a digital fingerprint of the collection including the opcode, the format code, and the function prototype for each invocation command filtered from the bytecode. For example, at step 308 generation module 110 may, as part of server 206 in FIG. 2, generate digital fingerprint 218 of collection 220 including the opcode, the format code, and the function prototype for each invocation command filtered from bytecode 208.

As used herein, the term "digital fingerprint" generally refers to any generated data that uniquely identifies or fingerprints underlying data such as collection 220. In one embodiment, the digital fingerprint may include a cryptographic hash of collection 220. A hashing algorithm may produce output hash values that (1) are of uniform size and/or (2) are impractical to transform back into the underlying data. Nevertheless, these features are not necessary for all embodiments, and generation module 110 may use other fingerprinting techniques.

Generation module 110 may generate the digital fingerprint in a variety of ways. In some examples, generation module 110 (and/or filtration module 106) may generate the digital fingerprint by excluding, through the filtering, at least one non-invocation command from the collection used to generate the digital fingerprint based on a determination that the non-invocation command does not constitute an invocation command. Similarly, generation module 110 may generate the digital fingerprint by excluding, through the filtering, multiple non-invocation commands from the collection used to generate the digital fingerprint based on a determination that each non-invocation command does not constitute an invocation command. In a more specific embodiment, generation module 110 may generate the digital fingerprint by excluding, through the filtering, each non-invocation command in the bytecode associated with the malware program from the collection used to generate the digital fingerprint based on a determination that each non-invocation command in the bytecode does not constitute an invocation command.

In one embodiment, generation module 110 and/or addition module 108 may further add a function prototype for the bytecode associated with the malware program to the collection prior to generating the digital fingerprint. For example, the invocation commands filtered from the bytecode may all be located within a larger method, function, or class, such as a method 420 shown in FIG. 4. Notably, the commands shown within bytecode 208 in FIG. 4 may simply represent an excerpt of method 420 rather than the entirety of method 420. Accordingly, each of the invocation commands within the larger function or class may have its own function prototype, while the larger function or class may also have its own function prototype. Generation module 110 and/or addition module 108 may add the further function prototype for the overall function or class to the collection. For example, at step 405 of FIG. 4, generation module 110 and/or addition module 108 may add, to collection 220, a function prototype "VL" for the larger overall method, function, or class (i.e., method 420) that contains filtered invocation commands 402. After the addition of this further function prototype to collection 220, generation module 110 may generate the digital fingerprint of collection 220 that now includes the further function prototype (e.g., generate a digital fingerprint of collection 220 after step 405 instead of after step 403, although both embodiments are contemplated and disclosed).

In some examples, generation module 110 may generate the digital fingerprint in part by ordering the invocation commands in the collection prior to generating the digital fingerprint of the collection. Notably, generation module 110 may optionally order the invocation commands either before and/or after the filtering of a prefix and/or suffix (or other portion of previously filtered indication commands). Generation module 110 may order the invocation commands using any arbitrary or predefined ordering function that, for example, maps input sets of commands to unique orderings. By creating unique orderings, generation module 110 may overcome polymorphic behavior that attempts to obscure malware by arbitrarily, randomly, or otherwise reordering lines of the malware code without significantly affecting the malware functionality of the malware program.

Notably, generation module 110 may also create multiple digital fingerprints, including digital fingerprints based on any permutation of options, including filtering a prefix, filtering a suffix, no filtering of a prefix and suffix, executing an ordering algorithm to order invocation commands, and/or not executing an ordering algorithm. Thus, generation module 110 may generate at least six digital fingerprints (not ordered original, not ordered prefix, not ordered suffix, ordered original, ordered prefix, and ordered suffix). Moreover, performance module 112 may check candidate malware programs under evaluation by attempting to match them to all or some of these digital fingerprints. As shown in FIG. 4, at step 407, generation module 110 may generate a digital fingerprint 218, as discussed above.

At step 310 one or more of the systems described herein may perform a remedial action to protect a user in response to detecting the presence of a variant of the malware program by determining that the digital fingerprint matches a candidate instance of bytecode under evaluation. For example, at step 310 performance module 112 may, as part of server 206 in FIG. 2, perform, through a computer security system, a remedial action to protect a user in response to detecting the presence of a variant of malware program by determining that digital fingerprint 218 matches a candidate instance of other bytecode under evaluation.

As used herein, the term "variant" generally refers to a polymorphic variation of the malware program that does not substantially alter the underlying malware functionality of the program. Similarly, the term "candidate instance of bytecode," as used herein, generally refers to a newly encountered, unknown, or other program under evaluation by an anti-malware or security system, as discussed above. Furthermore, the term "remedial action," as used herein, generally refers to any action that a computer security system may take to protect a user in response to detecting a threat or potential threat. Examples of remedial actions include notifying the user, notifying a client-side security system or agent, inhibiting the functionality of the malware program, quarantining the malware program, generating a new fingerprint or identifier of the malware program, adding the fingerprint or identifier to a database, and/or monitoring behavior of the malware program, for example.

Performance module 112 may determine that the candidate bytecode under evaluation matches the digital fingerprint in a variety of ways. Notably, performance module 112 and/or generation module 110 may generate any digital fingerprint for the candidate bytecode in the same or parallel manner used to generate the previously generated digital fingerprint at step 308 of FIG. 3. Accordingly, performance module 112 and/or generation module 110 may filter invocation commands from the candidate bytecode under evaluation using the same filtering algorithm. Moreover performance module 112 and/or generation module 110 may further filter a prefix and/or suffix in the same manner that either of these was further filtered to generate the earlier generated digital fingerprint 218, as discussed above. Notably, performance module 112 may generate multiple digital fingerprints, using multiple filtering, ordering, prefix, and/or suffix techniques, as discussed above, and attempt to match each of these multiple digital fingerprints against respective and corresponding previously generated digital fingerprints for known malware programs.

Performance module 112, and/or any other module or Security Response Engineer (SRE), may use generated digital fingerprints in a variety of ways. For example, performance module 112 may upload a digital fingerprint for a malicious method to either a cloud-based database, such as database 120, or to other client devices in the field, to protect those devices from potential infection. Accordingly, performance module 112 may attempt to match the digital fingerprint to corresponding digital fingerprints for new bytecode under evaluation either server-side (at a security back end server) or client-side at the devices to be protected in the field.

Similarly, performance module 112, and/or any other module or SRE (such as generation module 110), may generate digital fingerprints for methods that are known to be safe or non-malicious. When a new application package (such as an ANDROID application package or APK file)

arrives, performance module 112 may strip methods from the application package that are known to have safe digital fingerprints, which may leave a smaller set of methods for further analysis.

As a further example, performance module 112, and/or another module, may perform dynamic analysis to identify which method invokes a sensitive or predetermined application programming interface. In other words, one or more of modules 102 may perform the above steps for generating a digital fingerprint of a method based on a determination that the method invokes a sensitive application programming interface, as identified, through dynamic analysis, within the invocation path for invoking the sensitive application programming interface.

As an additional example, performance module 112, and/or another module, may extract one or more strings from a method (or method digital fingerprint) under evaluation. Performance module 112 may similarly associate previously identified strings with known good and known bad methods. Performance module 112 may then analyze which known good and known bad methods contained the extracted strings from the method (or method fingerprint) under evaluation. Similarly, performance module 112 may simply calculate a ratio of known good and known bad methods (or known methods of unknown safety) that contain or match the one or more strings extracted from the method under evaluation. Accordingly, performance module 112 may compare the calculated ratio with a predefined threshold to determine whether to perform a remedial action. Performance module 112 may also additionally or alternatively modulate performance of a remedial action in proportion to the calculated ratio.

As discussed above, the systems and methods described herein may prevent successful polymorphism of malware programs by generating digital fingerprints for those programs that are based on core or essential features of those programs instead of potentially changing or variable features. Specifically, the systems and methods described herein may generate a digital fingerprint based on the invocation commands within malware code, as opposed to non-invocation commands, which may be more likely to change in polymorphic variants.

Figure 5:
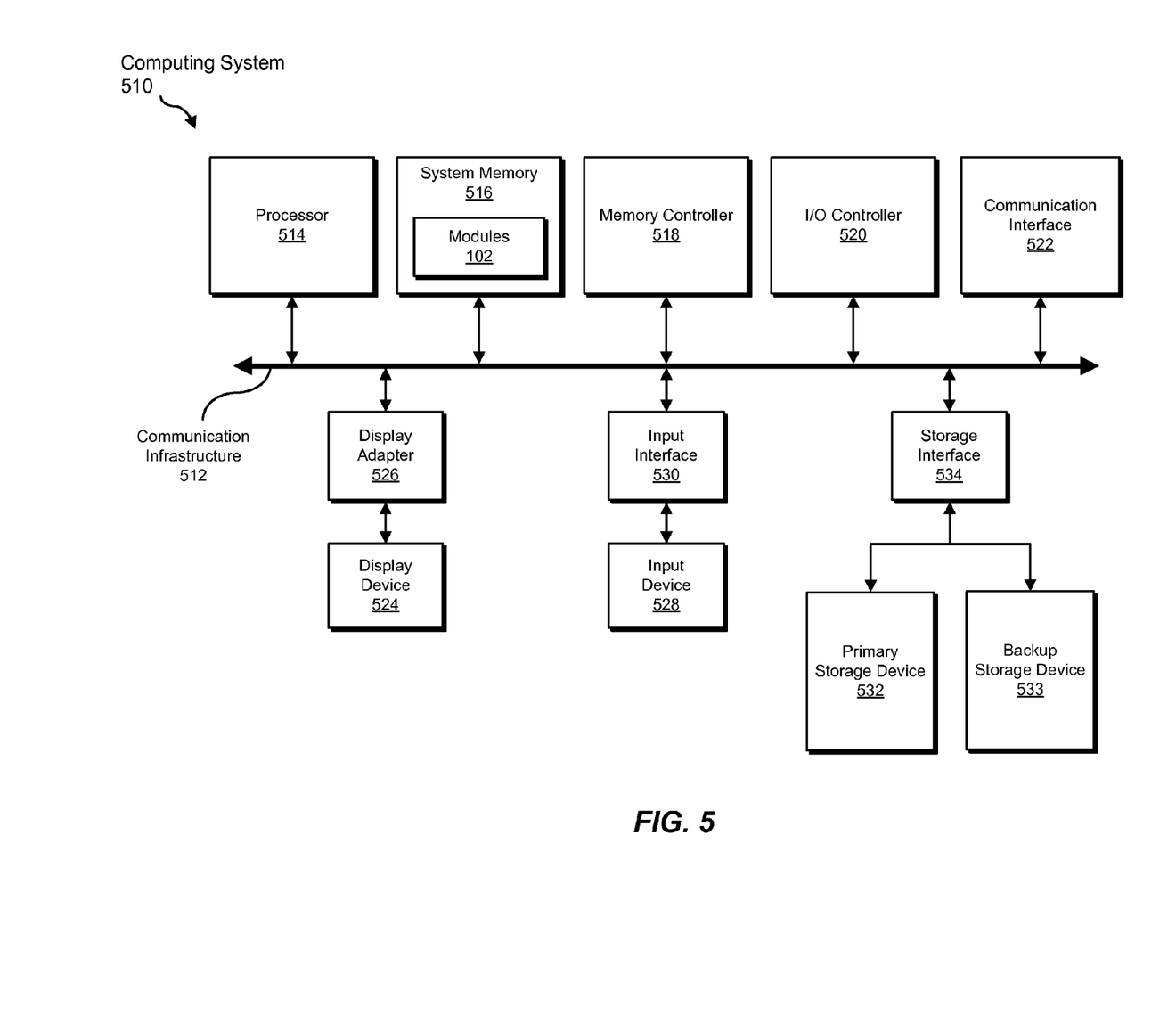
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
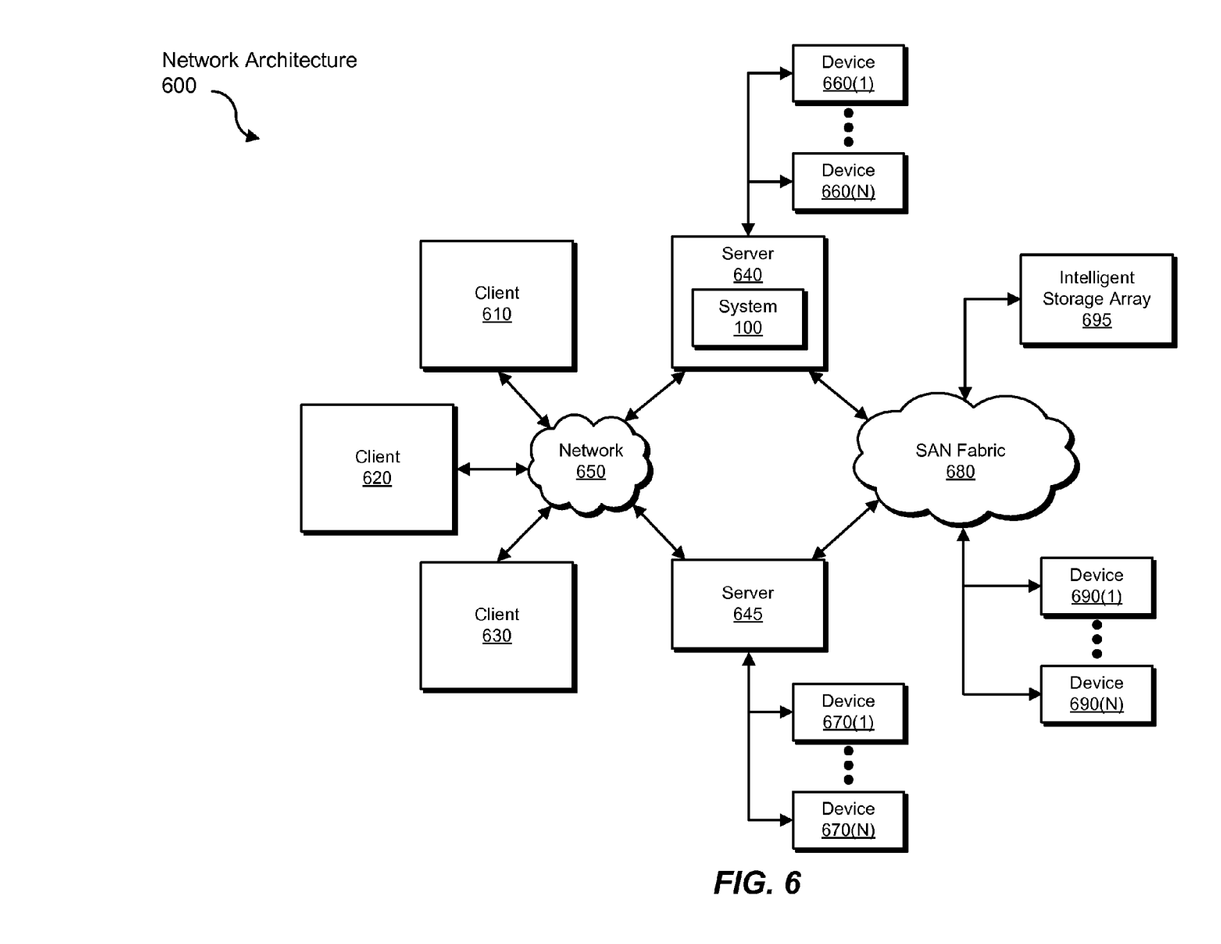
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for identifying malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive bytecode to be transformed, transform the bytecode by filtering one or more invocation commands and/or excluding one or more non-invocation commands from generation of a digital fingerprint, output a result (e.g., digital fingerprint) of the transformation to an anti-malware database, use the result of the transformation to protect a user or organization from malware, and store the result of the transformation to a storage device or memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying malware, at least a portion of the method being performed by a computing device comprising at least one processor, the method comprising:
   determining, for multiple commands within bytecode associated with a malware program, whether each command constitutes an invocation command;
   filtering, based on the determination, invocation commands from the bytecode;
   adding, for each invocation command filtered from the bytecode, a concatenation comprising an opcode, a format code, and a function prototype to a collection of concatenations comprising opcodes, format codes, and function prototypes;
   generating at least two digital fingerprints based on the collection of the concatenations comprising the opcode, the format code, and the function prototype for each invocation command filtered from the bytecode, the at least two digital fingerprints comprising at least two of:
      a digital fingerprint of the collection after executing an ordering algorithm on the collection;
      a digital fingerprint of the collection without executing the ordering algorithm;
      a digital fingerprint of a prefix of the collection; and
      a digital fingerprint of a suffix of the collection; and
   performing, by a computer security system, a remedial action to protect a user in response to detecting the presence of a variant of the malware program by determining that a candidate instance of bytecode under evaluation matches at least one of the at least two generated digital fingerprints.

2. The method of claim 1, wherein filtering, based on the determination, invocation commands from the bytecode comprises excluding, through the filtering, at least one non-invocation command based on a determination that the non-invocation command does not constitute an invocation command.

3. The method of claim 2, wherein filtering, based on the determination, invocation commands from the bytecode comprises excluding, through the filtering, a plurality of non-invocation commands based on a determination that each non-invocation command in the plurality does not constitute an invocation command.

4. The method of claim 3, wherein filtering, based on the determination, invocation commands from the bytecode comprises excluding, through the filtering, each non-invocation command in the bytecode associated with the malware program based on a determination that each non-invocation command in the bytecode does not constitute an invocation command.

5. The method of claim 1, wherein the opcode identifies a type of the invocation command.

6. The method of claim 1, wherein the function prototype identifies at least one of:
a number and type of parameters passed to a function through the invocation command; and
a number and type of return values returned by the function after invoking its execution through the invocation command.

7. The method of claim 1, wherein the format code specifies information that describes the format of the invocation command.

8. The method of claim 7, wherein the format code specifies:
an argument word count for the invocation command; and
information describing registers used by the invocation command.

9. The method of claim 1, further comprising:
adding a function prototype for the bytecode associated with the malware program to the collection prior to generating the at least two digital fingerprints,
wherein generating the at least two digital fingerprints is performed based on the collection that includes the added function prototype for the bytecode in addition to the opcode, the format code, and the function prototype for each invocation command within the bytecode.

10. The method of claim 1, wherein the at least two digital fingerprints include the digital fingerprint of the collection after executing the ordering algorithm on the collection.

11. The method of claim 1, wherein the at least two digital fingerprints include the digital fingerprint of the suffix of the collection.

12. The method of claim 11, wherein the at least two digital fingerprints include the digital fingerprint of the prefix of the collection.

13. The method of claim 11, wherein the bytecode comprises SMALI code.

14. The method of claim 1, wherein at least one of the digital fingerprints comprises a cryptographic hash of the collection comprising the opcode, the format code, and the function prototype for each invocation command filtered from the bytecode.

15. A system for identifying malware, the system comprising:
a determination module, stored in memory, that determines, for multiple commands within bytecode associated with a malware program, whether each command constitutes an invocation command;
a filtration module, stored in memory, that filters, based on the determination, invocation commands from the bytecode;
an addition module, stored in memory, that adds, for each invocation command filtered from the bytecode, a concatenation comprising an opcode, a format code, and a function prototype to a collection of concatenations comprising opcodes, format codes, and function prototypes;
a generation module, stored in memory, that generates at least two digital fingerprints based on the collection of the concatenations comprising the opcode, the format code, and the function prototype for each invocation command filtered from the bytecode, the at least two digital fingerprints comprising at least two of:
a digital fingerprint of the collection after executing an ordering algorithm on the collection;
a digital fingerprint of the collection without executing the ordering algorithm;
a digital fingerprint of a prefix of the collection; and
a digital fingerprint of a suffix of the collection;
a performance module, stored in memory, that performs a remedial action to protect a user in response to detecting the presence of a variant of the malware program by determining that a candidate instance of bytecode under evaluation matches at least one of the at least two generated digital fingerprints; and
at least one physical processor configured to execute the determination module, the filtration module, the addition module, the generation module, and the performance module.

16. The system of claim 15, wherein the filtration module filters, based on the determination, invocation commands from the bytecode at least in part by excluding, through the filtering, at least one non-invocation command based on a determination that the non-invocation command does not constitute an invocation command.

17. The system of claim 16, wherein the filtration module filters, based on the determination, invocation commands from the bytecode at least in part by excluding, through the filtering, a plurality of non-invocation commands based on a determination that each non-invocation command in the plurality does not constitute an invocation command.

18. The system of claim 17, wherein the filtration module filters, based on the determination, invocation commands from the bytecode at least in part by excluding, through the filtering, each non-invocation command in the bytecode associated with the malware program based on a determination that each non-invocation command in the bytecode does not constitute an invocation command.

19. The system of claim 15, wherein the opcode identifies a type of the invocation command.

20. A non-transitory computer-readable medium comprising one or more computer-readable instructions that, when executed by at least one processor of a computing device, cause the computing device to:
determine, for multiple commands within bytecode associated with a malware program, whether each command constitutes an invocation command;
filter, based on the determination, invocation commands from the bytecode;
add, for each invocation command filtered from the bytecode, a concatenation comprising an opcode, a format code, and a function prototype to a collection of concatenations comprising opcodes, format codes, and function prototypes;
generate at least two digital fingerprints based on the collection of the concatenations comprising the opcode, the format code, and the function prototype for each invocation command filtered from the bytecode, the at least two digital fingerprints comprising at least two of:
a digital fingerprint of the collection after executing an ordering algorithm on the collection;
a digital fingerprint of the collection without executing the ordering algorithm;
a digital fingerprint of a prefix of the collection; and
a digital fingerprint of a suffix of the collection; and perform, by a computer security system, a remedial action to protect a user in response to detecting the presence of a variant of the malware program by determining that a candidate instance of bytecode under evaluation matches at least one of the at least two generated digital fingerprints.

\* \* \* \* \*